July 18, 1939.   W. F. HUCK   2,166,153
MATRIX MAKING MACHINE WITH PRESSURE INDICATOR
Filed Aug. 3, 1935   2 Sheets-Sheet 1

Inventor
William F. Huck
By Albert J. Horton
Attorney

July 18, 1939.  W. F. HUCK  2,166,153
MATRIX MAKING MACHINE WITH PRESSURE INDICATOR
Filed Aug. 3, 1935  2 Sheets—Sheet 2
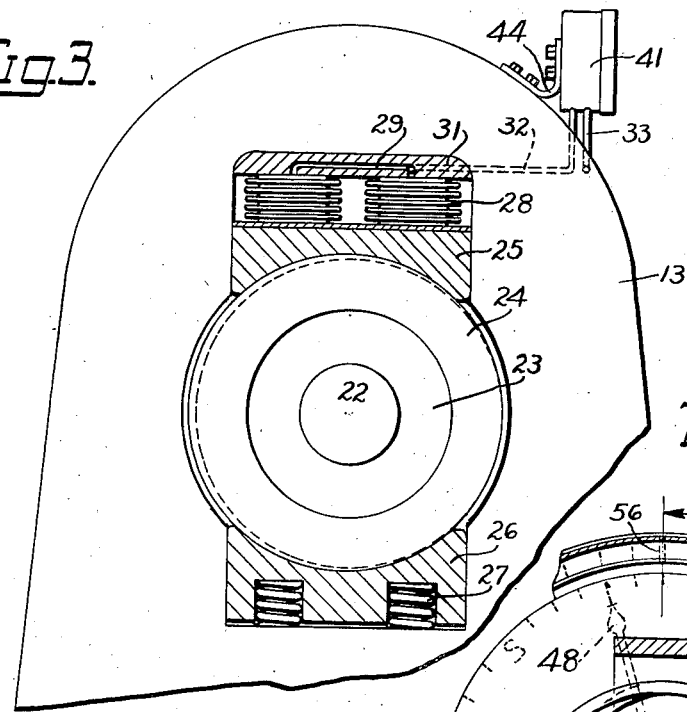
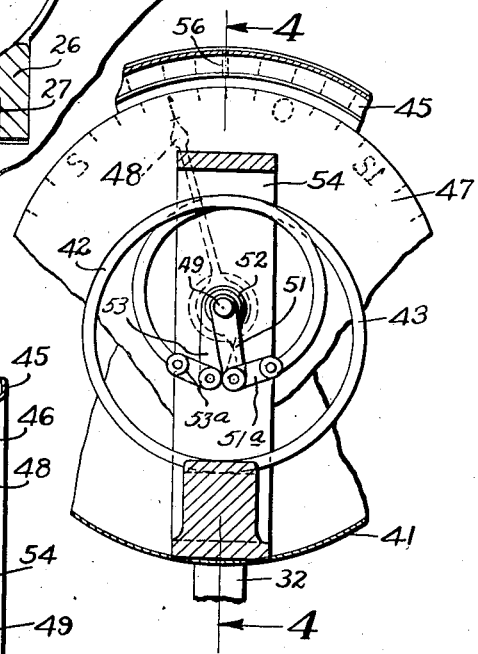
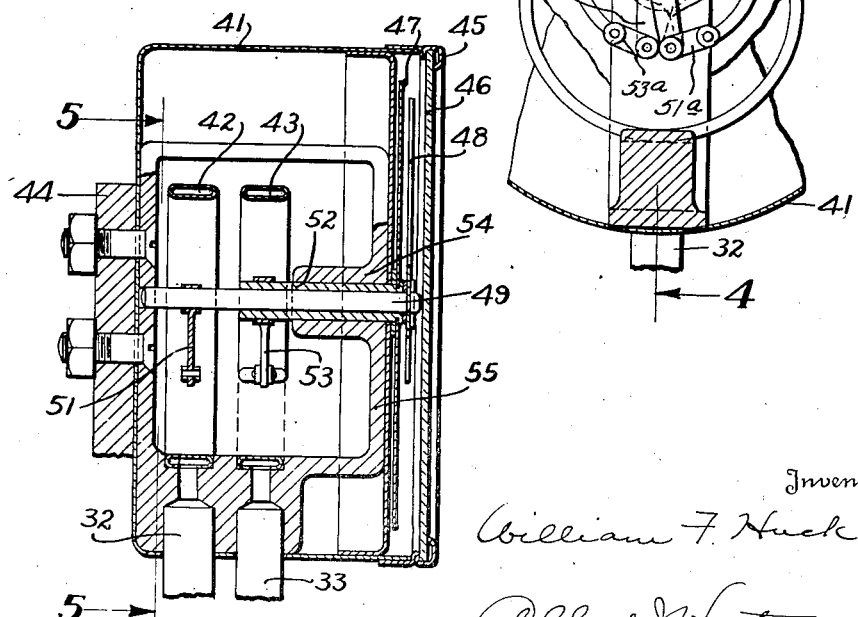
Inventor
William F. Huck
By Albert J. Horton
Attorney Patented July 18, 1939

2,166,153

UNITED STATES PATENT OFFICE 2,166,153

MATRIX MAKING MACHINE WITH PRESSURE INDICATOR

William F. Huck, Richmond Hill, N. Y., assignor to R. Hoe & Co., Inc., New York, N. Y., a corporation of New York Application August 3, 1935, Serial No. 34,520

8 Claims. (Cl. 265—47)

This invention relates to rolling machines and more particularly to improvements in matrix rolling machines for use in association with printing and like machines, contemplating the provision of pressure indicating means for this type of equipment.

In the use of matrix rolling machines it is particularly desirable to be able to ascertain, at all times, the pressure being applied, so that adjustments may be made to insure that the impressions, formed in the matrix material by the form, will be sharply defined, and that the pressure thereon will not be sufficient to cause damage to the matrix or be insufficient to properly obtain the desired impression. Various devices have been suggested for indicating the pressure applied by a roller but due to the arrangement and conditions of their application and to their structure, they do not indicate the pressure with sufficient accuracy.

One of the objects of this invention is to provide an improved matrix rolling machine having mechanism included in its structure for ascertaining and indicating the pressure being applied to the matrix being rolled thereby.

Another object is to provide for use with a matrix or like rolling machine, pressure indicating mechanism which will visually indicate, substantially accurately, the pressure being applied to a product being passed between cooperating surfaces.

Still another object is to provide a pressure indicating mechanism which is applicable to the bearings of a pressure roller in such a manner as to indicate the pressure of the roller upon the product being pressed thereby.

A further object is to povide, in association with each of the bearings of a pressure exerting roller, a pressure responsive device, and indicating means in connection therewith and operable thereby, to separately indicate the pressure on each bearing and particularly the sum of these pressures.

It is also an object of this invention to provide a pressure indicator for a matrix rolling machine of generally improved construction, whereby the device will be simple, durable and inexpensive in construction, as well as convenient, practical, serviceable and efficient in its use.

With the foregoing and other objects in view, which will appear as the description proceeds, the invention resides in the combination and arrangement of parts, and in the details of construction hereinafter described and claimed, it being understood that various changes in the precise embodiment of the invention herein disclosed may be made within the scope of what is claimed without departing from the spirit of the invention.

The preferred embodiment of the invention is illustrated in the accompanying drawings, wherein:

Figure 3 is an end view of the machine showing the association of the mechanism of this invention with the adjacent parts thereof, certain parts being in section for the purpose of clear illustration;

Figure 4 is a vertical sectional view of the visual indicating device or gauge, forming a part of the mechanism of this invention, which view is one looking generally in the direction of arrows 4—4 of Figure 5; and Figure 5 is a partial sectional view of the gauge on line 5—5 of Figure 4 and showing certain parts in an operating position.

Figure 1:
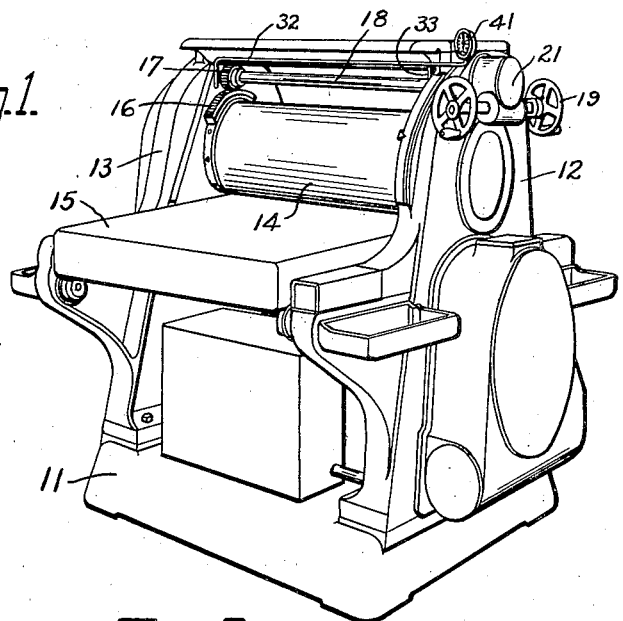
Figure 1 is a view of a matrix rolling machine having the features of this invention embodied in its structure.
Figure 2:
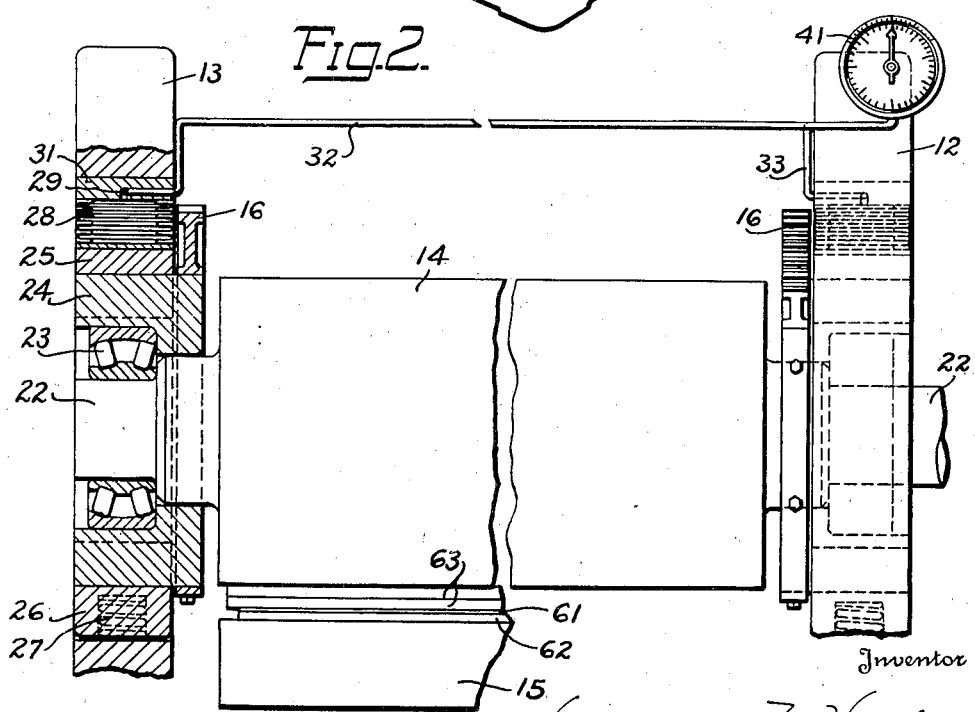
Figure 2 is the front view of the machine shown in Figure 1 partly in section and with various parts, not directly associated with the mechanism of this invention, omitted for the sake of clearness.

The principles and features of this invention are illustrated in the above drawings, embodied in operative association with the structure of a matrix rolling machine, shown in its entirety in Figure 1. The machine generally, comprises a base 11 having end frames 12 and 13 in which the opposite ends of a roller 14 are journaled. The roller 14 cooperates with a horizontally mounted reciprocable table 15 to apply pressure to a matrix to impress therein impressions from a type form disposed upon and carried by the table 15 beneath the roller 14. The pressure upon the matrix and type plate, passing between the roller 14 and the table 15, may be adjusted by means of gear segments 16 secured to each of the bearing supporting members at the roller ends and pinions 17 mounted on a shaft 18 to mesh with the segments 16. The shaft 18 may be rotated in either direction by means of hand wheels 19, one of which is disposed at each side of the machine and is rotatably connected to shaft 18 by suitable gearing disposed in casing 21.

The roller ends 22 are herein each shown mounted in a roller bearing 23 which, in turn, is mounted in a bearing supporting member 24. The bearing supporting members 24 are each mounted in an end frame between upper and lower blocks 25 and 26 respectively. The members 24 are arranged eccentric to the roller 14, as shown in Fig. 3, and each has one of the gear segments 16 secured thereto whereby it may be rotated between blocks 25 and 26, and due to its eccentric mounting raise and lower roller 14 relatively to table 15, to adjust the pressure thereof upon a matrix and a type plate disposed therebetween. The blocks 25 and 26 are mounted in the end frames 12 and 13 for vertical sliding movement and are constantly being urged upwardly by springs 27 provided to engage the lower block 26 and react against the adjacent part of the frames 12 or 13.

Between each of the upper blocks 25 and the adjacent part of the frames 12 or 13 is disposed a pressure responsive device, herein in the form of metal bellows or Sylphons 28, there being two of such devices used at each end of the roller 14, in this instance. The interiors of each of the bellows 28, at each end of the roller 14, are connected by passageways 29 formed in a plate 31. The plates 31 form the top member of the bellows 28 and are in contact with the adjacent part of the frames 12 or 13. The bellows 28 are filled with a suitable liquid and, as well known, are compressible lengthwise whereby pressure will be applied to the liquid contained therein. By the above described arrangement of parts pressure applied to the matrix between roller 14 and table 15 will be transmitted to the liquid in the bellows 28 tending to compress the same.

A tube 32 is in connection with the passageway 29 provided in the plate 31 disposed in the frame 13, and a tube 33 is in connection with the passageway 29 in the plate 31 disposed in the frame 12. The tubes 32 and 33 are directed into a gauge casing 41 wherein they are in connection with the fixed end of Bourdon tubes 42 and 43 respectively.

The gauge casing 41 may be disposed in any convenient position on the machine and is herein shown secured to the frame 12 by means of a bracket 44. A suitable end cover ring 45, holding a glass cover 46, is provided for the gauge casing 41, and through which a dial 47 and a pointer 48 are visible. The pointer 48 is connected to the end of a shaft 49, which in turn, is connected to the free end of the Bourdon tube 42 by a lever 51 and a link 51a. Herein the shaft 49 is rotatably supported within a hollow shaft 52, on one end of which the dial 47 is secured. The shaft 52 is connected to the free end of the Bourdon tube 43 by a lever 53 and a link 53a and is rotatably supported in a bearing member 54 formed as part of a gauge frame 55. Arrangements are such that, when movement of the Bourdon tubes takes place, due to pressure of the liquid in the system, or the release of such pressure, the pointer 48 will be rotated in one direction and the dial 47 in the other, whereby the total pressure being applied by roller 14 may be ascertained by readings from the zero on the dial to the position of the pointer. The reading so obtained constitutes the sum of the pressure at each bearing of the roller 14 and is particularly accurate.

Arrangement may be made to indicate the amount of pressure at each bearing by providing a zero mark on the cover ring 45 as at 56. By providing indicia in both directions from this point comparisons of the pressure on either bearing may be ascertained by the deflection of either the dial 47 or the pointer 48 from the point 56.

The above described mechanism, in combination with the associated operable parts of a matrix rolling machine, is particularly useful in connection with the operation of such a machine to directly and visually indicate the pressure being applied by the roller substantially accurately, and by comparison to indicate the proportion of such pressure at each bearing. By proper adjustment of the bearings when the machine is being assembled equal pressure on each may be obtained whereby uniform pressure will be applied throughout the length of the roller 14 upon the matrix 61 being pressed, and uniformly sharply defined impressions will be made therein over its entire area by the type form 62. The pads or blankets 63 are used to insure the flow of matrix material into the impressions on the type form 62 and as a cushioning means between the roller 14 and the matrix 61.

It will be understood that the invention may be embodied in other specific forms without departing from the spirit or essential attributes thereof, and it is therefore desired that the present embodiment be considered in all respects as illustrative and not restrictive, reference being had to the claims rather than to the foregoing description to indicate the scope of the invention.

What I claim is:

1. In a matrix rolling machine having a rotatable roller cooperating with a reciprocable table to press a matrix therebetween, a roller supporting mechanism including, means to receive upwardly directed pressure from axially spaced apart portions of the roller, means to adjust the pressure at these roller portions, and means operatively connected to each of said pressure receiving means to indicate the pressure received thereby at these roller portions and the pressure imposed upon the matrix by the entire roller.

2. In a matrix rolling machine having a rotatable roller cooperating with a reciprocable table to press a matrix therebetween, roller pressure indicating mechanism including, means to indicate the upwardly directed pressure at each end of the roller, said means cooperating to indicate the sum of such pressures, and means to vary the pressure of the roller upon the matrix.

3. In a matrix rolling machine having a rotatable roller cooperating with a reciprocable table to press a matrix therebetween, bearing members at each end of said roller, means to adjust said bearing members toward and away from said table, pressure responsive means disposed at each bearing member to receive upwardly directed pressure therefrom, and pressure indicating means operably connected to each of said pressure responsive means to be operated thereby to indicate the pressure of each end of the roller and the sum of such pressures imposed by the roller upon the matrix.

4. In a matrix rolling machine having a roller cooperating with a slidable table to press a matrix therebetween, a pressure indicating mechanism, including a pair of bellows-like members adapted to be disposed one at each bearing of said roller, to be affected by the upwardly directed pressure thereon, a Bourdon type tube connected with each bellows-like member and operable thereby, and a rotatable indicating member operably associated with each tube for rotation thereby to indicate the pressure of the roller ends upon the matrix and cooperating to indicate the pressure of the entire roller upon the matrix.

5. In a matrix making machine, a rotatable roller cooperating with a reciprocating table, shaft ends on said roller, bearings in which said shaft ends are journaled, a bearing support for each shaft bearing and whose axis is eccentric to the axis of said bearing, a lower bearing block supporting each of said bearing supports, an upper bearing block engaging each of said bearing supports, a frame member in which each set of said bearing blocks is slidably mounted, a pressure responsive device between each of said upper bearing blocks and the adjacent frame member, and means actuated by each of said pressure responsive devices to indicate the upwardly directed pressure at each bearing and the sum of said pressures.

6. In a matrix making machine, a rotatable roller cooperating with a reciprocating table, shaft ends on said roller, bearings in which said shaft ends are journaled, a bearing support for each shaft bearing and whose axis is eccentric to the axis of said bearing, a lower bearing block supporting each of said bearing supports, an upper bearing block engaging each of said bearing supports, a frame member in which each set of said bearing blocks is slidably mounted, a pressure responsive bellows disposed between each of said upper bearing blocks and the adjacent frame member, a spring disposed between said lower bearing block and the adjacent frame member, a pressure indicating device having two indicating members and a connection between each one of said bellows and one of said indicating members whereby the upwardly directed pressure at each bearing will be indicated separately and by comparison between same, the sum of these pressures may be readily ascertained.

7. In a matrix making machine, a pressure applying roller, pressure responsive means disposed at each end of said roller to be actuated by the upwardly directed pressure imposed on the adjacent bearings thereof, a pressure indicating device having a rotatable dial with indicating marks thereon and a rotatable pointer, said dial being connected to one, and said pointer connected to the other of said pressure responsive devices for actuation thereby, and a casing enclosing said dial and said pointer having indicating marks thereon, said indicating marks on said dial and on said casing cooperating to indicate the upward pressure on one bearing when said dial is rotated and said indicating marks on said casing and said pointer cooperating to indicate the upward pressure on the other bearing when said pointer is rotated, the sum of the respective indications denoting pressure on each bearing being ascertained by direct reading of the indicating marks on said dial as indicated by said pointer.

8. In a matrix forming machine, a rotatable roller adapted to cooperate with a reciprocable table to press upon a matrix disposed on said table, bearings for said roller adjustable to vary the pressure of the roller over the width of the matrix, and means to indicate the pressure of each end of the roller upon the matrix, including, a rotatable member actuated by the pressure at each roller end, and a stationary part cooperating with said members, said members being adapted to cooperate to indicate the entire pressure of the roller upon the matrix.

WILLIAM F. HUCK.